US012633733B1

(12) United States Patent
    Wilson et al.

(10) Patent No.: US 12,633,733 B1
(45) Date of Patent: May 19, 2026

(54) METHOD OF MARKING MUDRINGS TO INDICATE DEPTH

(71) Applicants: Robert Wilson, Clinton Township, MI (US); Matthew Knybel, Clinton Township, MI (US)

(72) Inventors: Robert Wilson, Clinton Township, MI (US); Matthew Knybel, Clinton Township, MI (US)

( * ) Notice: Subject to any disclaimer, the term of this patent is extended or adjusted under 35 U.S.C. 154(b) by 666 days.

(21) Appl. No.: 17/378,396

(22) Filed: Jul. 16, 2021

(51) Int. Cl.
    *H02G 3/12* (2006.01)
    *G01B 5/18* (2006.01)

(52) U.S. Cl.
    CPC ................. *H02G 3/12* (2013.01); *G01B 5/18* (2013.01)

(58) Field of Classification Search
    CPC ..................................... H02G 3/12; G01B 5/18
    See application file for complete search history.

(56) References Cited

U.S. PATENT DOCUMENTS

| | | | | | |
|---|---|---|---|---|---|
| 4,479,317 A | * | 10/1984 | Hanna | ...................... | H01H 9/18 |
| | | | | | 40/299.01 |
| 4,982,627 A | * | 1/1991 | Johnson | ................ | B23B 31/005 |
| | | | | | 81/177.1 |
| 5,031,488 A | * | 7/1991 | Zumeta | ................... | B25B 13/06 |
| | | | | | 116/335 |
| 5,181,439 A | * | 1/1993 | Schwartz | ............... | B25B 13/56 |
| | | | | | 81/436 |

| | | | | | |
|---|---|---|---|---|---|
| 5,330,230 A | * | 7/1994 | Craig | ........................ | G09F 3/00 |
| | | | | | 283/79 |
| 5,511,917 A | * | 4/1996 | Dickson | .................. | F16B 15/02 |
| | | | | | 411/14 |
| 5,914,665 A | * | 6/1999 | Thorp | .................... | G08B 7/062 |
| | | | | | 340/693.9 |
| 6,082,227 A | * | 7/2000 | Vogel | ..................... | B25B 13/56 |
| | | | | | 81/DIG. 5 |
| 6,172,301 B1 | * | 1/2001 | Goodsell | .................. | H02G 3/14 |
| | | | | | 174/67 |

(Continued)

FOREIGN PATENT DOCUMENTS

| | | | | | |
|---|---|---|---|---|---|
| CA | 2313819 C | * | 3/2011 | ............... | H02G 3/14 |
| WO | WO-2020234436 A1 | * | 11/2020 | | |

*Primary Examiner* — Kristina M Deherrera
*Assistant Examiner* — Tania Courson
(74) *Attorney, Agent, or Firm* — Robert M. Miller, PLLC

(57) ABSTRACT

A mudring for mounting on an electrical box includes a first planar flange, one or more side walls, a second planar flange, and an indicia. The first planar flange is generally configured for attaching the mudring to the electrical box. The one or more side walls generally extend from the first planar flange and define an inner opening configured to accept one or more electrical devices. The one or more sidewalls generally extend one of a plurality of distances from the first planar flange. The second planar flange generally extends into the inner opening from the one or more sidewalls. The second planar flange is substantially parallel to the first planar flange and is generally configured for attachment of the one or more electrical devices to the second planar flange. The indicia generally provides an indication corresponding to the distance the one or more sidewalls extend from the first planar flange. The indicia may be selected from a plurality of indicia corresponding to the plurality of distances the one or more sidewalls may extend from the first planar flange.

20 Claims, 6 Drawing Sheets

(56) References Cited

U.S. PATENT DOCUMENTS

| | | | | |
|---|---|---|---|---|
| 6,257,098 B1 * | 7/2001 | Cirone | ................. | G09F 3/00 |
| | | | | 81/DIG. 5 |
| 6,494,014 B2 * | 12/2002 | Lafrance | ................. | G01B 3/02 |
| | | | | 52/745.05 |
| 6,807,736 B2 * | 10/2004 | Langley | ................. | B26B 19/20 |
| | | | | 30/123 |
| 6,861,585 B1 * | 3/2005 | Kiely | ................. | H01R 9/2475 |
| | | | | 174/53 |
| 7,021,878 B1 * | 4/2006 | Albertson | ........... | F16B 15/0092 |
| | | | | 411/13 |
| 7,104,836 B1 * | 9/2006 | Gorman | ................. | H02G 3/12 |
| | | | | 439/535 |
| 7,151,218 B2 * | 12/2006 | Dinh | ................. | H02G 3/123 |
| | | | | 174/53 |
| 7,645,936 B2 * | 1/2010 | Magno, Jr. | ................. | H02G 3/14 |
| | | | | 174/53 |
| 7,691,759 B2 * | 4/2010 | Perry | ................. | F41B 11/00 |
| | | | | 442/77 |

| | | | | |
|---|---|---|---|---|
| 8,099,261 B2 * | 1/2012 | Braunstein | ................. | G09F 13/22 |
| | | | | 703/1 |
| 8,621,909 B2 * | 1/2014 | Buettner | ................. | B21D 28/34 |
| | | | | 83/684 |
| 8,739,444 B2 * | 6/2014 | Poole | ................. | G01B 3/34 |
| | | | | 283/81 |
| D718,159 S * | 11/2014 | Shallcross | ................. | D10/64 |
| 9,297,628 B2 * | 3/2016 | Sluder, III | ................. | G01B 3/28 |
| 9,616,553 B2 * | 4/2017 | Marovets | ................. | B25B 13/08 |
| 10,935,360 B1 * | 3/2021 | Mah | ................. | G01B 3/30 |
| 2006/0048964 A1 * | 3/2006 | Rick | ................. | H02G 3/126 |
| | | | | 174/66 |
| 2013/0312997 A1 * | 11/2013 | Korte | ................. | H02G 3/123 |
| | | | | 174/56 |
| 2014/0202758 A1 * | 7/2014 | Lolachi | ................. | H02B 1/40 |
| | | | | 403/376 |
| 2019/0376643 A1 * | 12/2019 | Witherbee | ................. | H02G 3/10 |
| 2021/0203143 A1 * | 7/2021 | Cohen | ................. | H02G 3/12 |

* cited by examiner

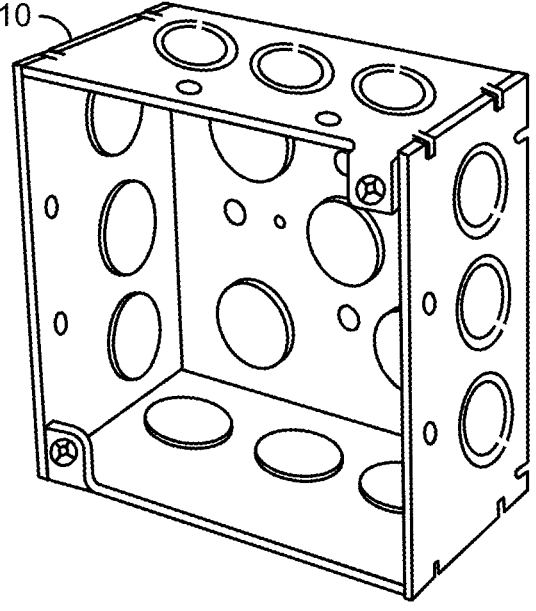
4 INCH SQUARE BOX
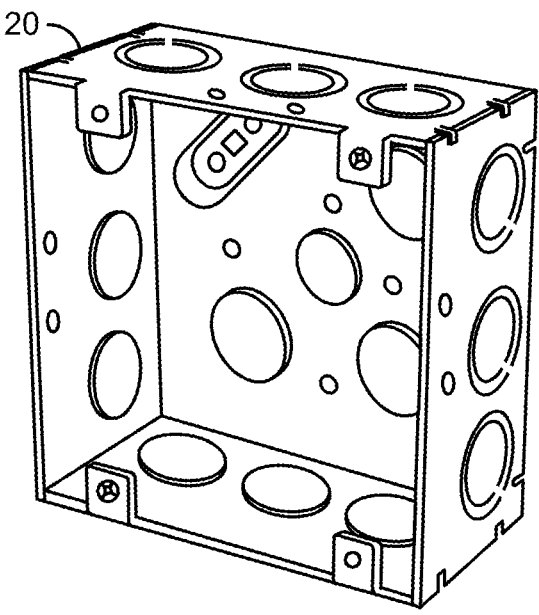
4 11/16 INCH SQUARE BOX
FIG. 1

FIG. 3

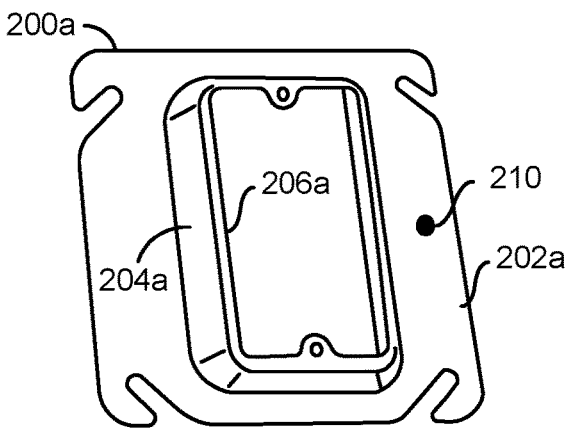
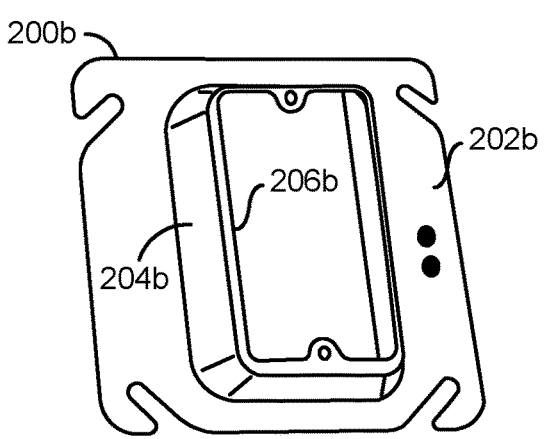
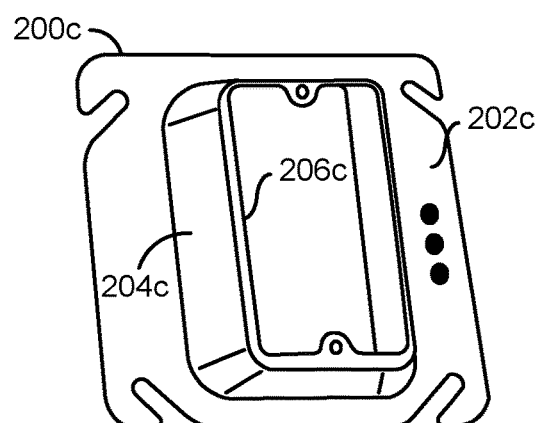
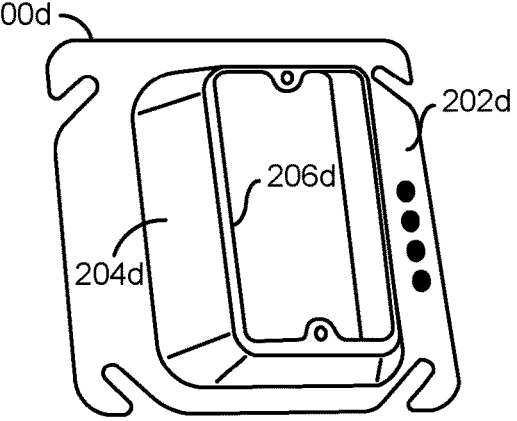
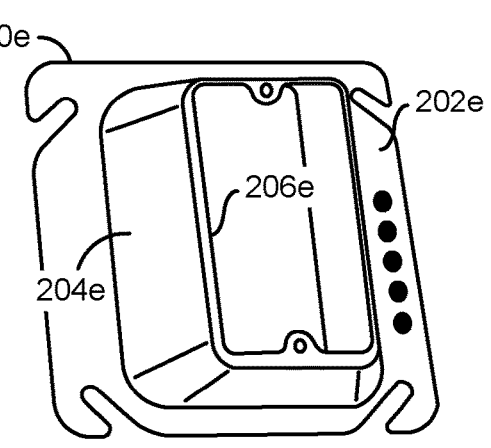
<u>FIG. 4</u>

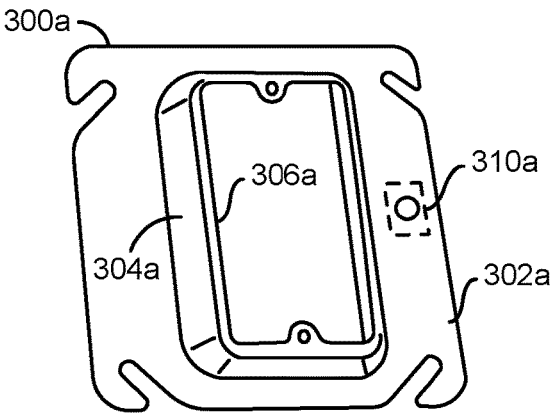
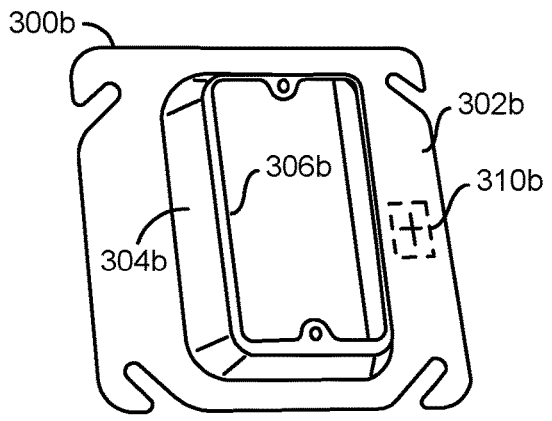
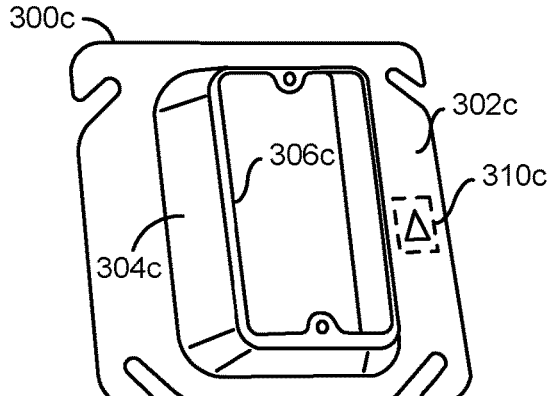
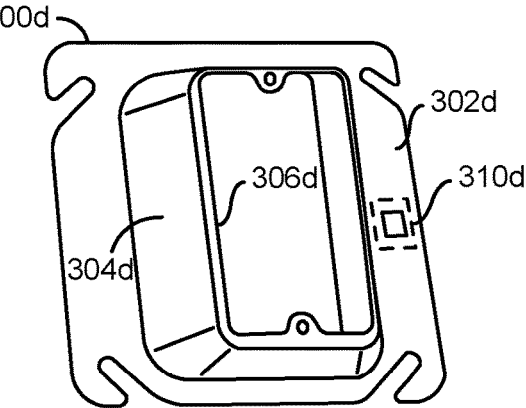
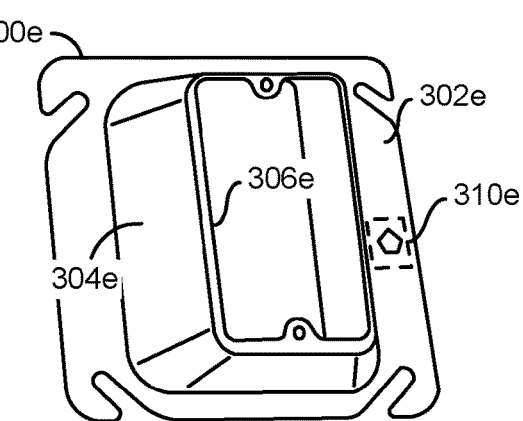
FIG. 5

METHOD OF MARKING MUDRINGS TO INDICATE DEPTH

FIELD OF THE INVENTION

The invention relates to electrical boxes generally and, more particularly, to a method and/or apparatus for implementing a method of marking mudrings to indicate depth.

BACKGROUND

Mudrings are used in commercial construction. Mudrings are mounted to electrical junction boxes behind wall coverings, such as plaster, lath, tile, and drywall, to allow electrical devices to be mounted flush with a front surface of the wall coverings. Mudrings come in a variety of depths (e.g., ranging from flat to 3½ inches). At a commercial work site, mudrings of different sizes typically are dumped into a single bin. Combining similar parts into a single bin saves space on job sites. Combining similar parts into a single bin also saves space and time for transporting parts to job sites from the shop because only a few boxes of parts need to be moved instead of many boxes. Because the mudrings look similar, finding a particular depth mudring at a particular time can be difficult, especially in low light levels often found on a construction site. The mixing of various sizes of mudrings required on a job site increases labor costs by causing delays in workers ability to find a particular mudring at a particular time.

It would be desirable to implement a method of marking mudrings to indicate depth.

SUMMARY

The invention concerns a mudring for mounting on an electrical box comprising a first planar flange, one or more side walls, a second planar flange, and an indicia. The first planar flange is generally configured for attaching the mudring to the electrical box. The one or more side walls generally extend from the first planar flange and define an inner opening configured to accept one or more electrical devices. The one or more sidewalls generally extend one of a plurality of distances from the first planar flange. The second planar flange generally extends into the inner opening from the one or more sidewalls. The second planar flange is substantially parallel to the first planar flange and is generally configured for attachment of the one or more electrical devices to the second planar flange. The indicia generally provides an indication corresponding to the distance the one or more sidewalls extend from the first planar flange. The indicia may be selected from a plurality of indicia corresponding to the plurality of distances the one or more sidewalls may extend from the first planar flange.

BRIEF DESCRIPTION OF THE FIGURES

Embodiments of the invention will be apparent from the following detailed description and the appended claims and drawings.

FIG. 1 is a diagram illustrating examples of prior art square junction boxes to which different types of mudrings can be attached.

FIG. 3 is a diagram illustrating an example of mudrings marked in accordance with an embodiment of the invention.

FIG. 4 is a diagram illustrating another example of mudrings marked in accordance with another embodiment of the invention.

FIG. 5 is a diagram illustrating another example of mudrings marked in accordance with still another embodiment of the invention.

DETAILED DESCRIPTION OF THE EMBODIMENTS

Figure 2:
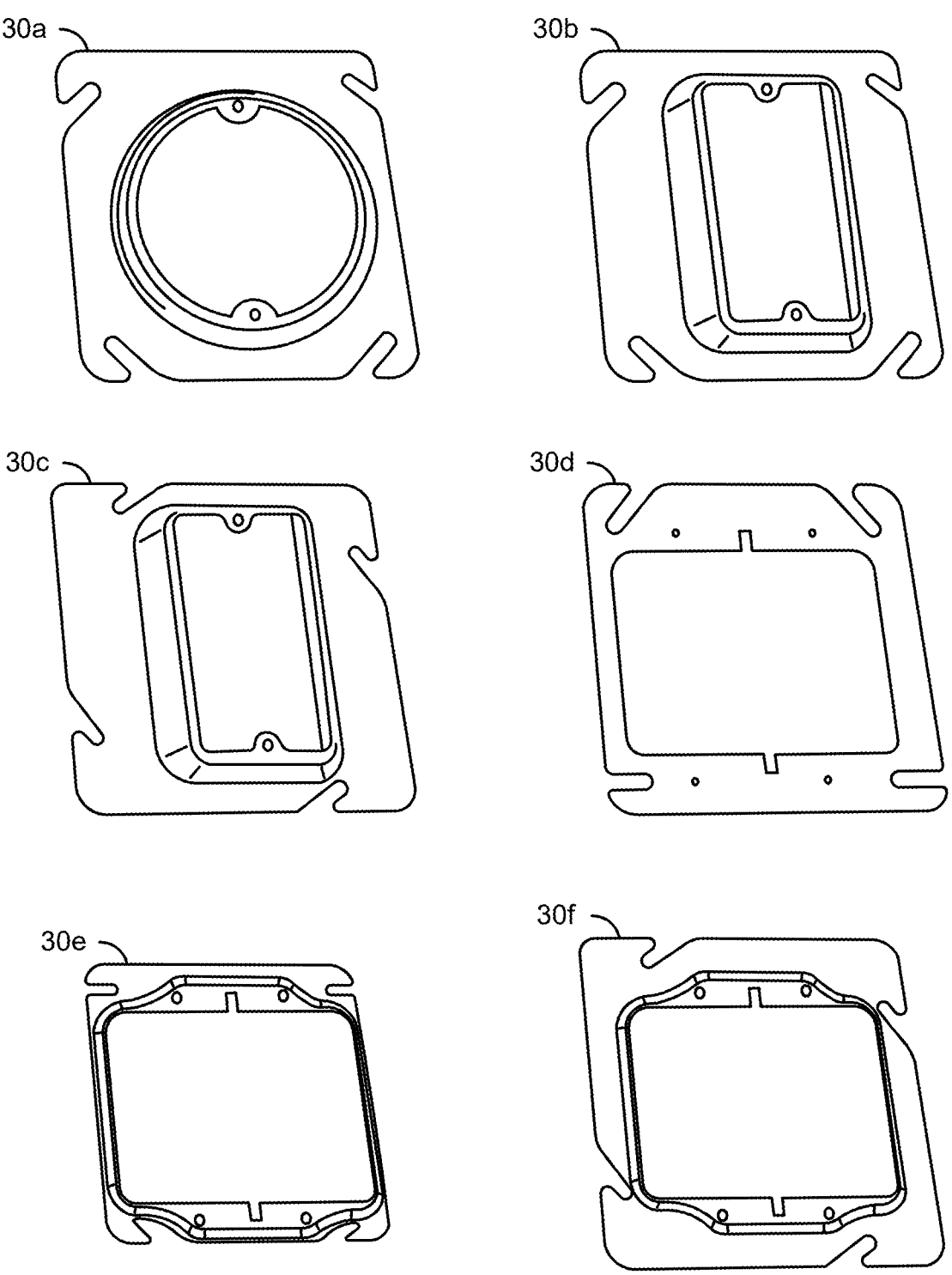
FIG. 2 is a diagram illustrating a number of types of prior art mudrings.

Embodiments of the present invention include providing a method (or system) of marking mudrings to indicate depth that may (i) utilize non-alphanumeric symbols to indicate a depth rating of a mudring, (ii) utilize different colors to represent different depths of mudrings, (iii) utilize one or more symbols to represent different depths of mudrings, (iv) be easily distinguishable in low light construction environments, (v) utilize a conventional metal stamping process to mark each mudring with a symbol corresponding to a respective depth, (vi) have minimal additional cost for manufacturing, and/or (vii) be easily integrated into current manufacturing processes.

Various wiring methods and state and federal codes require the electrical wiring of a building to be enclosed in metal conduit and so-called electrical junction boxes. A variety of electrical devices may be mounted on the electrical junction boxes for access by a user of the building. The electrical junction boxes are mounted within the walls of the building, with openings provided in the wall coverings for access to the junction boxes. The openings are usually smaller then the junction box itself. A mudring of a different size is attached to the electrical junction box. The electrical junction box remains concealed behind the wall covering or sheathing (e.g., drywall, plaster, tile, paneling, etc.). Replacement of the electrical junction box or the mudring attached to the electrical junction box is not possible without disturbing the wall finish and sheathing.

In general, the mudring has a depth equal to the thickness of the wall covering and extends through the opening in the wall. The open front of the mudring is generally positioned adjacent to the surface of the wall covering so that when a switch or receptacle is mounted in the electrical junction box, the front of the switch or receptacle will be substantially flush with the surface of the wall covering. Another reason of exact positioning of the electrical junction box is that some state end local codes require minimum distance from the face of the mudring to the wall plate covering the device (e.g., switch, receptacle, etc.). However because of the wide variety of types of walls in which the various wiring methods (e.g., conduit, pipe, MC cabling, ROMAX cabling, etc.) and electrical junction boxes are installed, and because the electrical junction boxes are typically installed before the wall coverings are applied to studs or other structural members, estimating the proper location of the electrical junction box to ensure that the front of the switch or receptacle will be flush with the wall surface is difficult.

Sometimes the electrical junction boxes are not installed at the right position according to the wall covering, which is an additional problem for the proper installation of the receptacle or switch. If the mudring protrudes out from the wall surface, then the switch or receptacle will appear unsightly. If the junction box is recessed too far from the wall surface, than the switch or receptacle may not be adequately protected from spark or other electrical hazards reaching surrounding combustible materials.

In many cases when the electrical junction box is installed too deep into the wall the switch or receptacle does not have support on the surface of the wall. If the switch or receptacle is too deep into the wall, the wall plate can not cover the switch or receptacle or the screws connecting the switch or receptacle to the mudring have to be left loose and then a good ground between the switch or receptacle and the junction box is missing. Furthermore, if the electrical junction box is too deeply recessed from the wall surface, it may not even be possible to mount the switch or receptacle. Being able to quickly select the proper depth mudring can save time and reduce construction costs.

Referring to FIG. 1, a diagram is shown illustrating a couple of examples of square junction boxes to which different types of mudrings can be attached. Various wiring methods and state and federal codes require the electrical wiring of a building to be enclosed in metal conduit and so-called electrical junction boxes. A variety of electrical devices may be mounted on the electrical junction boxes for access by a user of the building. The electrical junction boxes are mounted within the walls of the building, with openings provided in the wall coverings for access to the junction boxes. The openings are usually smaller then the junction box itself. Mudrings of different sizes are attached to the electrical junction boxes to allow electrical devices (e.g., switches, receptacles, fixtures, etc.) to be mounted and wired. The wiring connections are enclosed in the electrical junction box behind the mudring.

An example of a four inch square metal electrical junction box 10 and a $4^{11}/_{16}$ inch square metal electrical junction box 20 are shown in FIG. 1. However, there are many sizes of junction boxes available. The electrical junction boxes 10 and 20 have a number of pre-cut areas referred to as knockouts where the various wiring methods can be secured to the electrical junction box. The electrical junction boxes 10 and 20 have a number of threaded tabs that allow covers such as a mudring to be attached with screws. In an example, the four inch square metal electrical junction box 10 has two threaded tabs and the $4^{11}/_{16}$ inch square metal electrical junction box 20 has four threaded tabs. In various applications, the mudrings have four openings (slots) for use in attaching the mudrings to the boxes with screws. Mudrings on four inch square junction boxes are attached using only two screws. Mudrings on $4^{11}/_{16}$ inch square junction boxes may be attached using two or four screws. Similar attachment may be used for five and six inch electrical junction boxes.

Referring to FIG. 2, a diagram is shown illustrating a number of examples of conventional mudrings. A mudring is a raised device cover that is used to adapt an electrical junction box to accept one or more electrical devices (e.g., switches, receptacles, light fixtures, etc.). There are four main types of square junction boxes: four inches square, $4^{11}/_{16}$ inches square, five inches square, and six inches square. However, junction boxes may also be rectangular (e.g., multi-gang applications). Mudrings may by referred to by other names (e.g., plaster ring, plaster frame, device ring, fixture ring, p ring, tile ring, etc.). In an example, mudrings generally comprise metal device covers. Mudrings are generally manufactured from sheet metal using a metal stamping process. Mudrings are generally mounted to electrical junction boxes using either two or four screws. Mudrings allow a larger electrical junction box to be used behind a wall covering (e.g., paneling, plaster, drywall, etc.) to hold and protect wire connections. A portion of the mudrings extends through the wall covering allowing the electrical devices to mounted flush with a front surface of the wall covering.

A number of different mudrings are available. In an example, FIG. 2 illustrates five mudrings 30a-30f. The mudring 30a generally illustrates a mudring providing a raised round box cover. Various depths of the mudring 30a may be used on four square junction boxes for the support and hanging of various types of light fixtures and exit emergency signs. The mudring 30b generally illustrates a single-gang mudring. Various depths of the mudring 30b are used on four square junction boxes for the support and installation of a single electrical device including, but not limited to, a wall switch, a receptacle, or a ground fault circuit interrupter (GFCI). The mudring 30c generally illustrates another example of a single-gang mudring used on $4^{11}/_{16}$ inch junction boxes for the support and installation of a single electrical device including, but not limited to, a wall switch, a receptacle, or a GFCI. In an example, the square electrical junction boxes generally range in size from four inches to six inches. The mudring 30c is generally configured to mount to a $4^{11}/_{16}$ inches square electrical junction box with a different mounting screw pattern than the mudring 30b.

The mudrings 30d-30f generally illustrate examples of two-gang mudrings. The two-gang mudrings generally allow installation of two electrical devices (e.g., a switch and a receptacle or GFCI, two switches, two receptacles or GFCIs, etc.). The mudring 30d generally illustrates a flat box cover. The mudring 30d is generally used on a four square junction box for installation with a very thin wall covering such as sheet-metal, stainless steel, or one-eighth inch wood. The mudring 30e generally illustrates a raised box cover configured to mount to a four square electrical junction box having a first four-screw pattern. The mudring 30f generally illustrates a raised box cover configured to mount to a $4^{11}/_{16}$ inch electrical junction box having a second four-screw pattern. Although single-gang and double-gang mudrings are illustrated in FIG. 2, mudrings with a greater number of device positions are also available.

Figure 3:
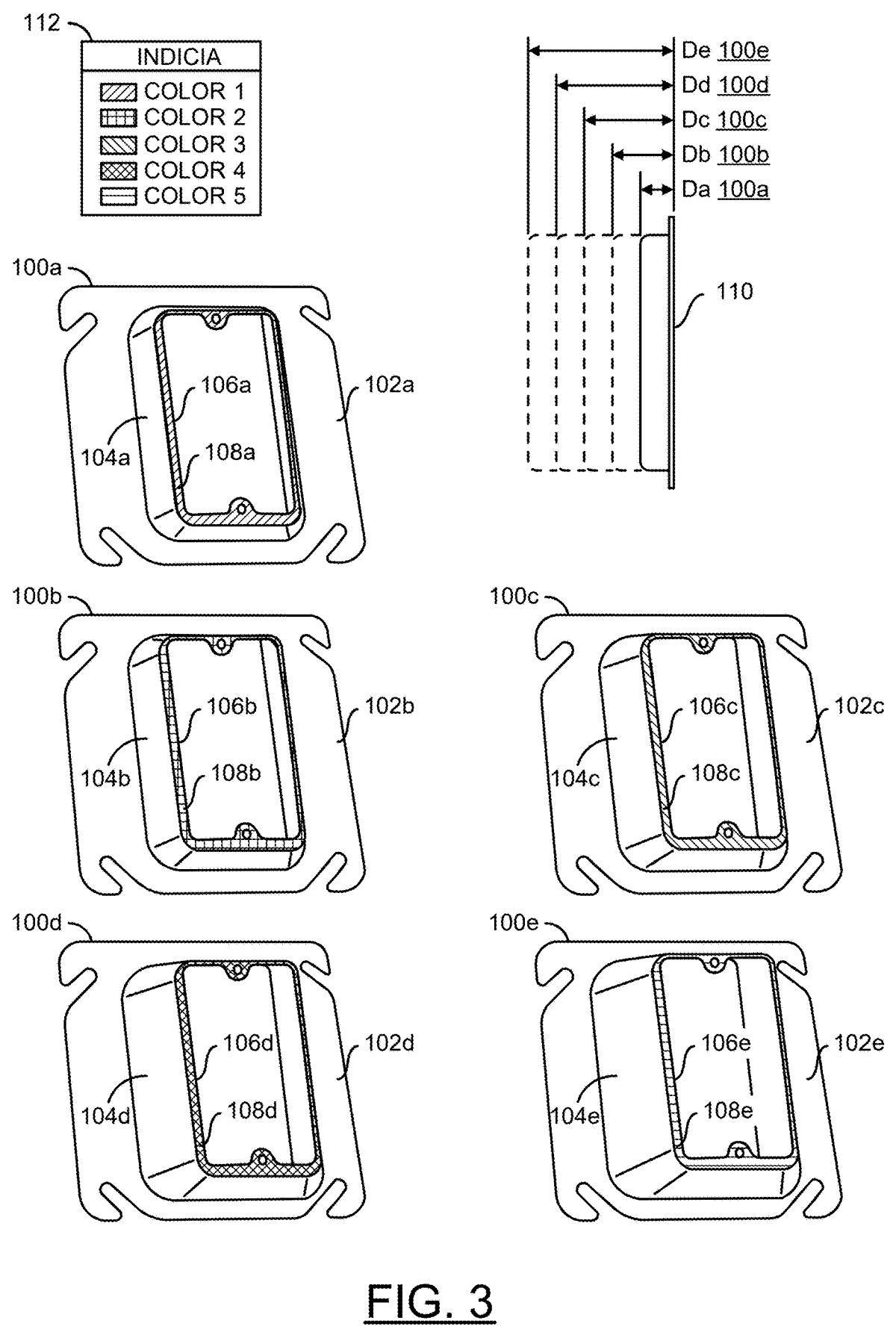

Referring to FIG. 3, a diagram is shown illustrating an example of color coding mudrings in accordance with an embodiment of the invention. In an example a number of mudrings 100a-100e are shown illustrating a method of using different colors to provide indication of different depths (or raised heights). In an example, the mudrings 100a-100e may have incremental differences in a depth (or raised height). In an example, each of the mudrings 100a-100e may comprise a first planar flange 102a-102e, one or more sidewalls 104a-104e extending away from first planer flange 102a-102e, and a second planar flange 106a-106e. The one or more side walls 104a-104e generally extend from the first planar flanges 102a-102e and define an inner opening configured to accept one or more electrical devices. The one or more sidewalls 104a-104e generally extend one of a plurality of distances from the first planar flanges 102a-102e. The second planar flanges 106a-106e generally extend into the inner opening from the one or more sidewalls 104a-104e. The second flanges 106a-106e are generally substantially parallel to the first planar flanges 102a-102e and are generally configured for attachment of the one or more electrical devices to the second planar flanges 106a-106e.

In an example, each of the mudrings 100a-100e may have a different depth (or raised height). A diagram 110 is shown illustrating an example comparison between respective depths Da-De of mudrings 100a-110e having incremental differences in depth. In an example, the mudring 100*a* may have a depth Da. The mudring 100*b* may have a depth Db. The mudring 100*c* may have a depth Dc. The mudring 100*d* may have a depth Dd. The mudring 100*e* may have a depth De. In one example, the depths (or distances) of the mudrings may increase incrementally from the mudring 100*a* to the mudring 100*e*. For example, the incremental change in depth of the mudrings 100*a*-100*e* may correspond to the depth of the mudring 100*a*. In an example, the incremental distance may be ¼ inch. In an example, the mudring 100*a* may have a depth of ¼ inch (e.g., Da=¼"), the mudring 100*b* may have a depth of ½ inch (e.g., Db=½"), the mudring 100*c* may have a depth of ¾ inch (e.g., Dc=¾"), the mudring 100*d* may have a depth of 1 inch (e.g., Dd=1"), the mudring 100*e* may have a depth of 1¼ inches (e.g., De=1¼"). In another example, the mudring 100*a* may have a depth of ⅛ inch (e.g., Da=⅛"), the mudring 100*b* may have a depth of ¼ inch (e.g., Db=¼"), the mudring 100*c* may have a depth of ⅜ inch (e.g., Dc=⅜"), the mudring 100*d* may have a depth of ½ inch (e.g., Dd=½"), the mudring 100*e* may have a depth of ⅝ inches (e.g., De=⅝"). However, other depths and/or increments may be implemented accordingly to meet design criteria of a particular application. In an example, a set of mudrings may have a range of depths from flat to 3½". In an example, the depths of the mudrings may have a non-uniform increment (e.g., ⅛", ¼", ⅜", ½", ⅝", ¾", ⅞", 1", 1¼", 1½", 1¾", 2", 2½", and 3½").

In an example, each of the mudrings 100*a*-100*e* may have the second planar flange 106*a*-106*e* painted with a different color indicia 108*a*-108*e* to indicate the particular depth of the respective mudring. In an example, the paint color may extend some distance from the second planar flange 106*a*-106*e* on the one or more sidewalls 104*a*-104*e*. In an example, the mudring 100*a* may have a first color indicia 108*a*, the mudring 100*b* may have a second color indicia 108*b*, the mudring 100*c* may have a third color indicia 108*c*, the mudring 100*d* may have a fourth color indicia 108*d*, and the mudring 100*e* may have a fifth color indicia 108*e* (illustrated by a shading legend 112). The colors 108*a*-108*e* of the second planar flanges 106*a*-106*e* of the mudrings 100*a*-100*e* generally correspond to the depths (raised height) of the respective mudrings. In an example, the colors 108*a*-108*e* of the second planar flanges 106*a*-106*e* may be selected as shown in the following Table 1:

TABLE 1

| COLOR | DEPTH |
| --- | --- |
| Green | ½" |
| Yellow | 5/8" |
| Orange | 3/4" |
| Black | 1" |
| Light Blue | 1-1/4" |

In another example, the colors 108*a*-108*e* of the second planar flanges 106*a*-106*e* may be selected as shown in the following Table 2:

TABLE 2

| COLOR | DEPTH |
| --- | --- |
| Black | 1/4" |
| Red | ½" |
| Orange | 3/4" |

TABLE 2-continued

| COLOR | DEPTH |
| --- | --- |
| Yellow | 1" |
| Green | 1-1/4" |

In another example, a two-tone scheme may be implemented in which a set of colors may be selected to indicate a major increment in depth and a separate color may be selected to indicate a minor increment in depth as shown in the following Table 3:

TABLE 3

| COLOR (S) | DEPTH |
| --- | --- |
| Black | 1/8" |
| Red | 1/4" |
| Red/Black | 3/8" |
| Orange | ½" |
| Orange/Black | 5/8" |
| Yellow | 3/4" |
| Yellow/Black | 7/8" |
| Green | 1" |

In various embodiments, the particular set of colors used to represent each depth of a number of mudrings may be selected depending on the lighting conditions of the environment in which the mudrings are to be distinguishable from one another.

Referring to FIG. 4, a diagram is shown illustrating another example of mudrings marked in accordance with an embodiment of the invention. In an example, instead of coloring the second planar flange of the mudrings, a number of occurrences of a symbol may be may used to indicate the respective depth of the mudrings. In an example, a number of mudrings 200*a*-200*e* are shown. In an example, the mudrings 200*a*-200*e* may have a first planar flange 202*a*-202*e*, one or more sidewalls 204*a*-204*e*, and a second planar flange 206*a*-206*e*. In an example, a symbol 210 may be used to indicate a depth of a particular mudring. In an example, the symbol 210 may comprise a filled circle. However, other symbols may be used accordingly. In an example, the symbol 210 may be marked (e.g., painted, etched, stamped, etc.) on the first planar flange of mudrings 200*a*-200*e*. In an example, the mudring 200*a* may have a single instance of the symbol 210 marked (e.g., painted, etched, stamped, etc.) on the first planar flange 202*a*, the mudring 200*b* may have two instances of the symbol 210 marked on the first planar flange 202*b*, the mudring 200*c* may have three instances of the symbol 210 marked on the first planar flange 202*c*, the mud ring 200*d* may have four instances of the symbol 210 marked on the first planar flange 202*d*, and the mudring 200*e* may have five instances of the symbol 210 marked on the first planar flange 202*e*. In an example, the number of instances of the symbol 210 generally corresponds to (encodes) the depth of the particular mudring. In an example, the depth of the mudrings 200*a*-200*e* may be indicated according to the following Table 4:

TABLE 4

| # of Symbol Instances | DEPTH |
| --- | --- |
| one | ½" |
| two | 5/8" |
| three | 3 /4" |

TABLE 4-continued

| # of Symbol Instances | DEPTH |
| --- | --- |
| four | 1" |
| five | 1-1/4" |

Referring to FIG. 5, a diagram is shown illustrating still another example of mudrings marked in accordance with an embodiment of the invention. In an example, a number of mudrings 300a-300e are shown using different symbols to indicate different depths of each mudring. In an example, the mudrings 300a-300e may have a first planner flange 302a-302e, one or more sidewalls 304a-304e, and a second planer flange 306a-306e. Each of the mudrings 300a-300e may have a symbol 310a-310e marked (e.g., stamped, etched, embossed, painted, etc.) on a face of the first planar flange 302a-302e, respectively. In an example, the symbol 310a may comprise a circle, the symbol 310b may comprise a plus sign, the symbol 310c may comprise a triangle, the symbol 310d may comprise a square, and the symbol 310e may comprise a pentagon. Other sets of symbols may be implemented accordingly to indicate depths of a set of mudrings.

In another example, a set of dual symbols may be used to indicate major and minor incremental depths. In an example, a set of indicia may be implemented to indicate a particular depth of a mudring as a combination of the minor and major increment. In an example, a minor increment may be 1/8 inch and a major increment may be 1/4 inch. A mudring with a 1/8 inch depth may be marked with a single symbol (e.g., a circle) representing the minor increment. A mudring with a 1/4 inch depth may be marked with a symbol (e.g., a triangle) representing the depth as a number of major increments. A mudring with a 3/8 inch depth may be marked with a dual symbol (e.g., a circle inside a triangle) representing the depth as a combination of a number of major increments and a minor increment. Other schemes of encoding the depths of a set of mudrings may be implemented accordingly.

In various embodiments, an additional manufacturing step may be added to a production process for mudrings. In an example, following production of mudrings using conventional techniques, the mudrings may be marked according to depth using a system or marking scheme as described above. In one example, the mudrings may be color-coded by painting the second planar flange (or face) of each mudring according to depth. In an example, the painting process may include, but is not limited to, applying a lacquer, an enamel, or a powder coat type painting process. In another example, the mudrings may be marked using a symbol scheme as described above in connection with FIGS. 4 and 5. In an example, the symbols may be added using a stamping process similar to one used to mark the mudrings with brand identifiers and certification marks (e.g., UL, etc.).

Figure 6:
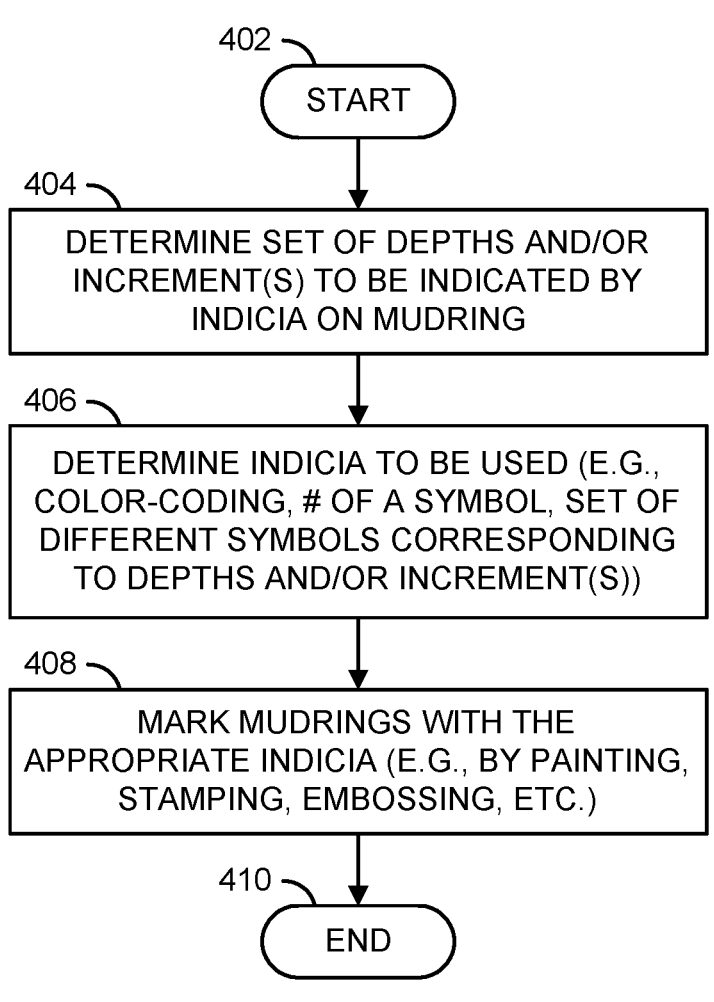
FIG. 6 is a diagram illustrating a process of producing mudrings marked in accordance with an embodiment of the invention.

Referring to FIG. 6, a diagram illustrating a process 400 of producing mudrings marked in accordance with an embodiment of the invention is shown. In an example, the process 400 may comprise a step (or state) 402, a step (or state) 404, a step (or state) 406, a step (or state) 408, a step (or state) 410. The process 400 may begin in the step 402 and move to the step 404. In the step 404, the process 400 may determine a set depths and/or increments of a set of mudrings to be indicated by marking the mudrings using a set of corresponding indicia (e.g., color, number of a symbol, symbols, etc.). In the step 406, the process 400 may determine which indicia (e.g., color, number of a symbol, symbols, etc.) is to be used to mark the mudrings. In the step 408, the process 400 may mark each mudring with the appropriate indicia corresponding to the depth of the mudring. In an example, marking the mudrings may include, but is not limited to, painting, stamping, etching, embossing, stenciling, or engraving. In the step 410, the process of marking the mudrings may be terminated.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A set of mudrings comprising a variety of depths, each mudring of said set of mudrings for mounting on an electrical box and comprising:

a first planar flange configured for attaching each mudring of said set of mudrings to said electrical box;

one or more sidewalls extending from said first planar flange and defining an inner opening configured to accept one or more electrical devices, wherein said one or more sidewalls extend a respective distance of a plurality of distances corresponding to said variety of depths from said first planar flange;

a second planar flange extending into said inner opening from said one or more sidewalls, wherein said second planar flange is parallel to said first planar flange and configured for attachment of said one or more electrical devices to said second planar flange; and a respective indicia marked on at least one of said first planar flange and said second planar flange of each mudring of said set of mudrings, said respective indicia providing an indication corresponding to said respective distance said one or more sidewalls extend from said first planar flange, wherein (i) said respective indicia is selected from a plurality of indicia that are non-alphanumeric and correspond to said plurality of distances corresponding to said variety of depths from said first planar flange, and (ii) said plurality of indicia enable quick selection of each mudring from said set of mudrings to match a thickness of a wall covering through which each mudring extends such that said second planar flange of each mudring is positioned adjacent to a front surface of the wall covering so that said one or more electrical devices when attached to said second planar flange are flush with the front surface of the wall covering.

2. The set of mudrings according to claim 1, wherein each of said plurality of indicia comprise a number of a symbol corresponding to an incremental change between said plurality of distances.

3. The set of mudrings according to claim 1, wherein said mudring comprises a metal stamping.

4. The set of mudrings according to claim 1, wherein said respective indicia is applied using a metal stamping process.

5. The set of mudrings according to claim 1, wherein said respective indicia is applied using a painting process.

6. The set of mudrings according to claim 1, wherein said plurality of indicia comprise different geometric shapes corresponding to each of the different depths of said one or more sidewalls.

7. The set of mudrings according to claim 6, wherein said plurality of indicia comprise a first geometric shape indicating a major increment and a second geometric shape indicating a minor increment.

8. The set of mudrings according to claim 1, wherein said plurality of indicia comprise at least one of color markings and geometric shapes.

9. The set of mudrings according to claim 8, wherein said color markings comprise different colors corresponding to each of the different depths of said one or more sidewalls.

10. The set of mudrings according to claim 9, wherein said color markings comprise a two-tone scheme combining a first color and a second color to indicate a major increment and a minor increment, respectively.

11. A method of manufacturing a set of mudrings comprising a variety of depths, each mudring of said set of mudrings for mounting to an electrical box, said method comprising the steps of:

forming each mudring comprising (i) a first planar flange configured for attaching each mudring to said electrical box, (ii) one or more side walls sidewalls extending from said first planar flange and defining an inner opening configured to accept one or more electrical devices, wherein said one or more sidewalls extend a respective distance of a plurality of distances corresponding to said variety of depths from said first planar flange, and (iii) a second planar flange extending into said inner opening from said one or more wherein is sidewalls, said second planar flange parallel to said first planar flange and configured for attachment of said one or more electrical devices to said second planar flange; and applying a respective indicia providing an indication corresponding to said respective distance said one or more sidewalls extend from said first planar flange, wherein (i) said respective indicia is applied to at least one of said first planar flange and said second planar flange, and is selected from a plurality of indicia that are non-alphanumeric and correspond to said plurality of distances corresponding to said variety of depths from said first planar flange, and (ii) said plurality of indicia enable quick selection of each mudring from said set of mudrings to match a thickness of a wall covering through which each mudring extends such that said second planar flange of each mudring is positioned adjacent to a front surface of the wall covering so that said one or more electrical devices when attached to said second planar flange are flush with the front surface of the wall covering.

12. The method according to claim 11, wherein applying said respective indicia comprises performing a painting process.

13. The method according to claim 11, wherein applying said respective indicia comprises performing one or more of etching, embossing, stenciling, or engraving.

14. The method according to claim 11, wherein said plurality of indicia comprise different colors.

15. The method according to claim 11, wherein said plurality of indicia comprise different geometric shapes.

16. The method according to claim 11, wherein each of said plurality of indicia comprise a number of a symbol corresponding to an incremental change between said plurality of distances.

17. The method according to claim 11, wherein forming each mudring of said set of mudrings comprises performing a first metal stamping process.

18. The method according to claim 17, wherein applying said respective indicia comprises performing a second metal stamping process.

19. A system of marking each mudring of a set of mudrings of varying depths comprising the steps of:

determining a depth of a mudring comprising (i) a first planar flange configured for attaching each mudring to an electrical 4 junction box, (ii) one or more sidewalls extending from said first planar flange and defining an inner opening configured to accept one or more electrical devices, wherein said one or more sidewalls extend a respective distance of a plurality of distances corresponding to said variety of depths from said first planar flange, and (iii) a second planar flange extending into said inner opening from said one or more sidewalls, wherein said second planar flange is substantially parallel to said first planar flange and configured for attachment of said one or more electrical devices to said second planar flange; and applying a respective indicia providing an indication corresponding to a determined depth of said mudring, wherein (i) said respective indicia is selected from a plurality of indicia that are non-alphanumeric and correspond to a plurality of depths of said set of mudrings to be marked, and (ii) said plurality of indicia enable quick selection of each mudring from said set of mudrings to match a thickness of a wall covering through which each mudring extends such that said second planar flange of each mudring is positioned adjacent to a front surface of the wall covering so that said one or more electrical devices when attached to said second planar flange are flush with the front surface of the wall covering.

20. The system of marking according to claim 19, wherein said plurality of indicia comprise at least one of non-alphanumeric symbols, different color markings, different geometric shapes, and a number of a non-alphanumeric symbol corresponding to an incremental change between said plurality of depths.

\* \* \* \* \*